US007085646B2

(12) United States Patent
Tanaka et al.

(10) Patent No.: US 7,085,646 B2
(45) Date of Patent: Aug. 1, 2006

(54) AUXILIARY SYSTEM FOR STARTING ENGINE

(75) Inventors: Yasuhiro Tanaka, Kariya (JP); Noriaki Terashima, Okazaki (JP); Makoto Kawatsu, Anjo (JP); Nobutomo Takagi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/231,925

(22) Filed: Sep. 22, 2005

(65) Prior Publication Data

US 2006/0080026 A1 Apr. 13, 2006

(30) Foreign Application Priority Data

Oct. 12, 2004 (JP) ............................ 2004-297593

(51) Int. Cl.
*G06F 19/00* (2006.01)

(52) U.S. Cl. .................................... 701/113; 123/179.3

(58) Field of Classification Search ................ 701/113; 123/179.3, 179.4, 594, 609, 640, 655
See application file for complete search history.

(56) References Cited

U.S. PATENT DOCUMENTS 4,528,956 A * 7/1985 Ogata et al. ........... 123/406.47
5,552,681 A * 9/1996 Suzuki et al. ............... 318/139
2003/0117113 A1* 6/2003 Takemasa et al. .......... 320/150
2004/0153235 A1* 8/2004 Kataoka et al. ............ 701/112
2004/0168664 A1 9/2004 Senda et al.
2005/0116474 A1* 6/2005 Edelson .................... 290/40 A
2005/0253458 A1* 11/2005 Omae et al. ............... 307/10.1
2005/0266957 A1* 12/2005 Kamijo et al. ................ 477/3
2005/0287880 A1* 12/2005 Okuyama ...................... 440/1

* cited by examiner

*Primary Examiner*—John T. Kwon
(74) *Attorney, Agent, or Firm*—Posz Law Group, PLC

(57) ABSTRACT

A load operating means controls electricity supplied from a power source to a starter in an auxiliary system for starting an engine. An engine control means and an auxiliary electricity supply means turn the load operating means ON for supplying electricity from the power source to the starter in accordance with electricity supply from a power supply device when the engine is started. When voltage of the power supply device becomes less than a reset level, the engine control means resets electricity supply to the load operating means. When the engine control means starts the engine, the auxiliary electricity supply means supplies electricity to the load operating means at a timing simultaneously with or in advance of supplying electricity by the engine control means. When the engine control means resets the electricity supply, the auxiliary electricity supply means supplies electricity instead of the engine control means.

14 Claims, 7 Drawing Sheets

AUXILIARY SYSTEM FOR STARTING ENGINE

CROSS REFERENCE TO RELATED APPLICATIONS

This application is based on and incorporates herein by reference Japanese Patent Application No. 2004-297593 filed on Oct. 12, 2004.

FIELD OF THE INVENTION

The present invention relates to an auxiliary system for starting an engine, the auxiliary system including a starter that starts the engine by supplying electricity to a starter motor.

BACKGROUND OF THE INVENTION

US2004/0168664A1 (JP-A-2004-257369) discloses an auxiliary system that includes an engine starter supplying electricity to a starter motor for starting an engine.

As shown in FIG. 7 a conventional engine-starting device includes switches 101, 102, a starter relay 103, a starter 104, and an engine-ECU 105.

The switch 101 is turned ON when a key cylinder is rotated to a start position. The switch 102 is turned ON, when a gear is in a neutral position or when the gear is in a parking position in an automatic-transmission car. Alternatively, the switch 102 is turned ON when a clutch is stepped in a manual-transmission car. The starter relay 103 includes a winding 103*a* and a relay switch 103*b*. The starter 104 includes a starter motor 104*a* and a starter coil 104*b*.

In this structure, when the gear is in the neutral position or in the parking position in the automatic-transmission car, the switch 102 is turned ON. Alternatively, when the clutch is stepped in the manual-transmission car, the switch 102 is turned ON. In these conditions, when the driver rotates the key cylinder to the start position, a signal is transmitted to the engine-ECU 105, so that the engine-ECU 105 supplies electricity from a power source 106 via a terminal 108, and the engine-ECU 105 outputs a signal for fuel injection in the engine.

Thus, the winding 103*a* of the starter relay 103 is supplied with electricity via the switch 102, so that the winding 103*a* generates electromagnetic force that attracts the starter switch 103*b*. The power source 106 supplies electricity to the starter coil 104*b* and the starter motor 104*a* of the starter 104, so that the engine is started. The engine-ECU 105 supplies electricity in accordance with a condition of the power source (battery). When the engine is started, voltage (battery voltage) of the power source 106 quickly decreases. As shown in FIG. 5, when the battery voltage is less than a predetermined reset level (engine-ECU reset level) at the timing T1, the battery voltage is insufficient for operating the engine-ECU 105. Accordingly, the engine-ECU 105 resets electricity supply, so that the engine-ECU 105 terminates supplying electricity to the winding 103*a*.

When the key cylinder is rotated to the start position, the switch 101 is turned ON, so that a terminal 107 supplies electricity from the power source 106, and the starter motor 104*a* is rotated. Thus, an engine starting load is gradually reduced while the starter motor 104*a* is rotated, so that the battery voltage gradually recovers in the period between T1 and T2 in FIG. 5. When the battery voltage increases to a recovery level (engine-ECU recovery level), the reset condition of the engine-ECU 105 is cancelled at the timing T2, subsequently the engine is restarted at the timing T3.

Thus, the conventional engine-starting device can start the engine, even in the case where the battery voltage decreases in engine starting.

However, an engine-starting device may have a structure, in which the terminal 107 cannot supply electricity from the power source 106 when the key cylinder is turned to the ON position.

In recent years, an engine-starting device including a push switch to start an engine is developed. This engine-starting device does not have a path such as a mechanical contact, through which the terminal 107 supplies electricity from the power source 106 to the starter relay 103, when the engine-ECU 105 resets electricity supply. Accordingly, this engine-starting device cannot start the engine when the engine-ECU 105 resets electricity supply.

In this engine-starting device, when the engine-ECU 105 resets electricity supply and engine starting is aborted, the battery voltage recovers to a level before the engine is started. However, when the engine is started again, the battery voltage decreases to be less than the reset level, because a load for staring engine is not reduced. Accordingly, even when the push switch is pushed over and over again, recovery and decrease in the battery voltage are repeated. As a result, the engine cannot be started.

SUMMARY OF THE INVENTION

In view of the foregoing and other problems, it is an object of the present invention to produce an auxiliary system for starting an engine, the auxiliary system being capable of starting the engine even when voltage of a battery becomes less than a reset level and an engine control means resets electricity supply in engine starting.

According to one aspect of the present invention, an auxiliary system for starting an engine includes a starter, a power source, a load operating means, an engine control means, and an auxiliary electricity supply means. The power source supplies electricity to the starter. The load operating means controls electricity supplied from the power source to the starter. The engine control means turns the load operating means ON for supplying electricity from the power source to the starter in accordance with electricity supply from a power supply device when the engine is started. The auxiliary electricity supply means turns the load operating means ON for supplying electricity from the power source to the starter in accordance with electricity supply from the power supply device when the engine is started. When voltage of the power supply device becomes less than a first reset level, the engine control means resets electricity supply to the load operating means. When the auxiliary electricity supply means inputs a signal, which indicates a condition where the engine control means starts the engine, the auxiliary electricity supply means supplies electricity to the load operating means at a timing simultaneously with or in advance of supplying electricity to the load operating means by the engine control means. When the engine control means resets electricity supply to the load operating means, the auxiliary electricity supply means supplies electricity to the load operating means instead of the engine control means.

In this structure, the auxiliary electricity supply means supplies electricity to the load operating means simultaneously with or before the engine control means starts electricity supply to the load operating means. Therefore, even when the engine control means resets electricity supply, the load operating means is regularly supplied with electricity from the auxiliary electricity supply means for the period, in which electricity supply from the engine control means is reset and terminated, regardless of the timing of the reset performed by the engine control means. Thereby, the load operating means can be restricted from repeating turning ON and OFF in a short period, so that terminals of the load operating means can be restricted from causing abrasion and welding. Furthermore, an operation of the auxiliary system for starting an engine can be stabled.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 6:
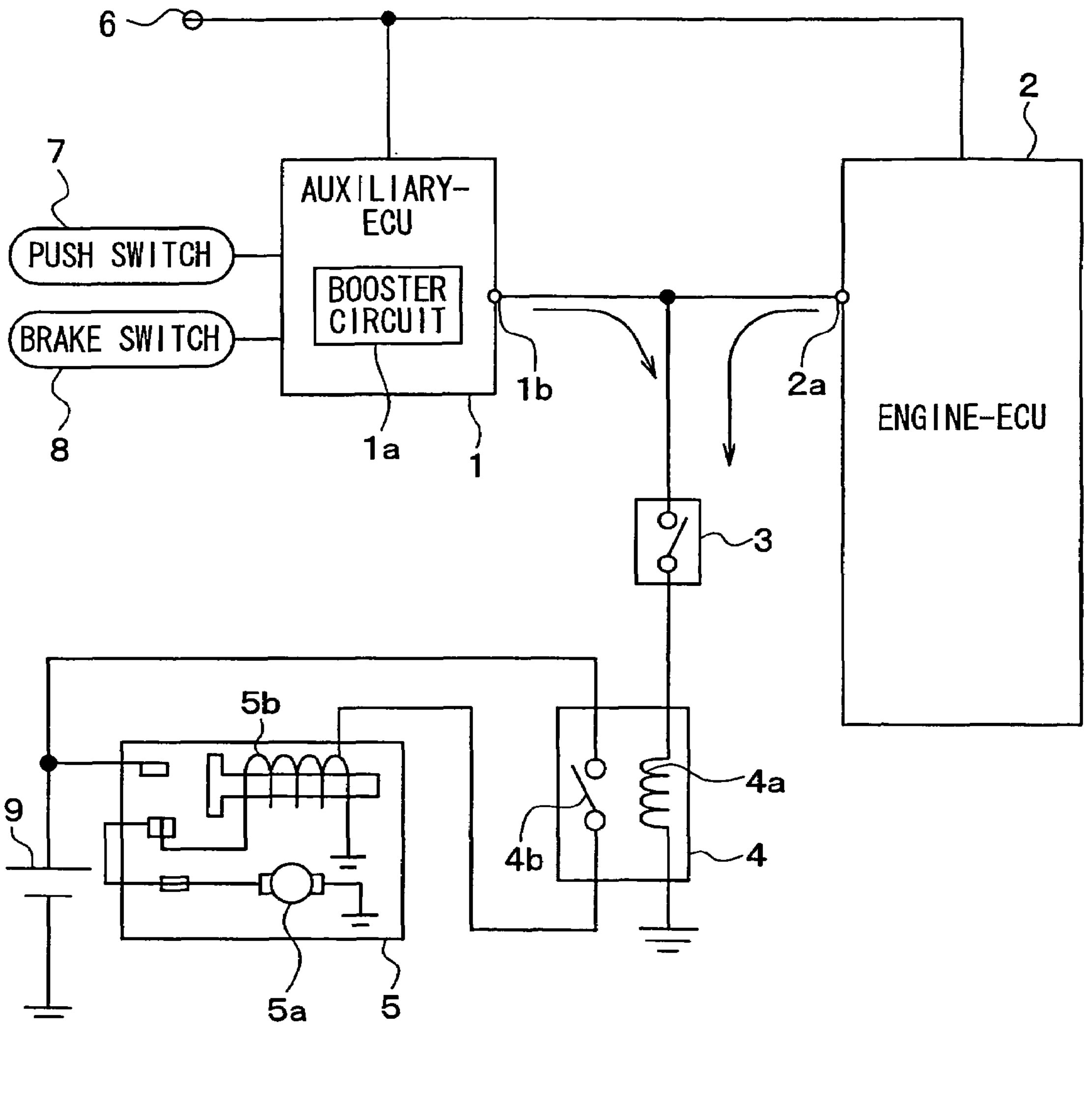
FIG. 6 RELATED ART
FIG. 6 is a schematic diagram showing an auxiliary system for starting an engine, according to a related art.
Figure 7:
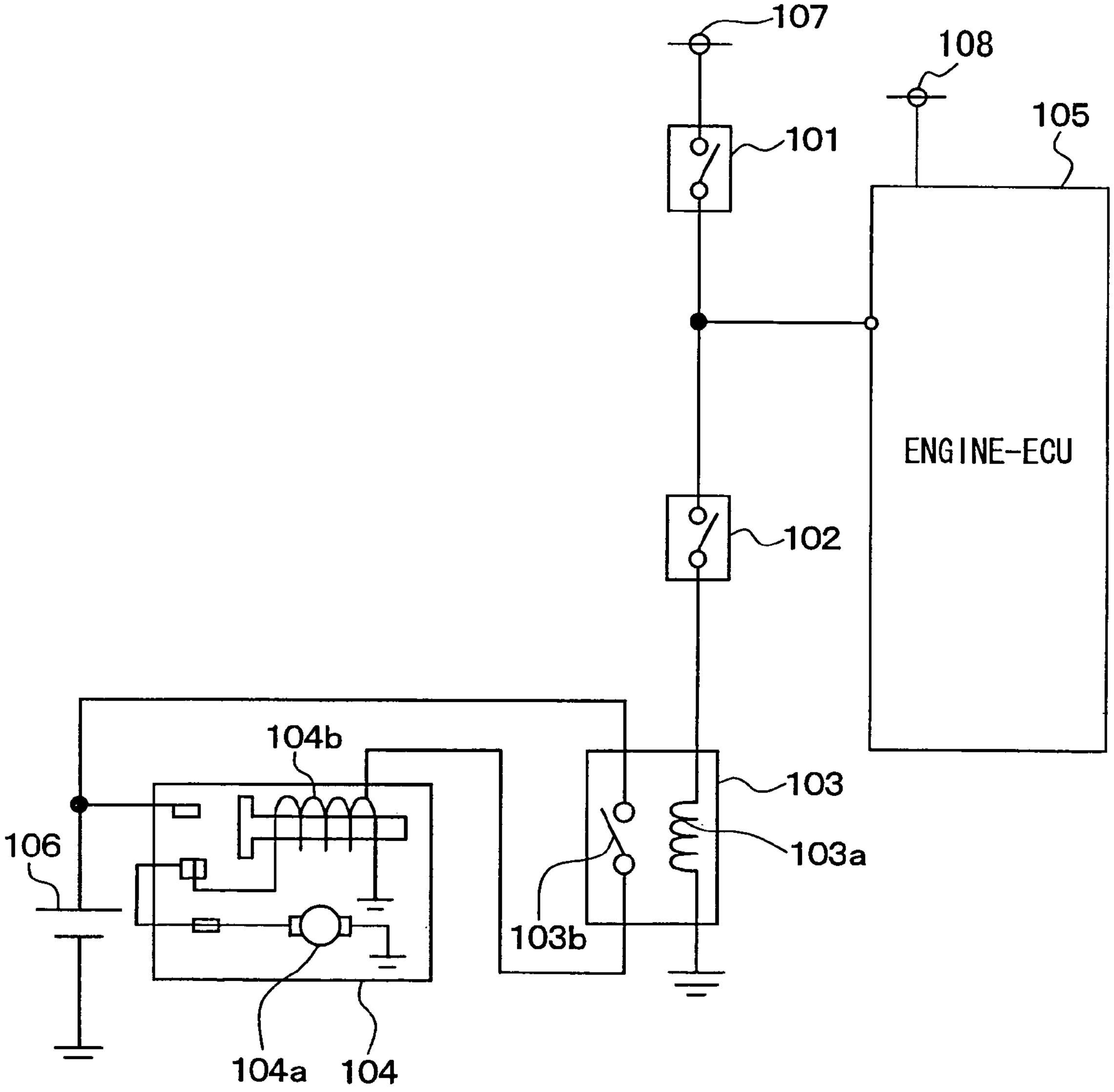
FIG. 7 PRIOR ART
FIG. 7 is a schematic diagram showing an auxiliary system for starting an engine, according to a prior art.

A structure of an auxiliary system (engine starting auxiliary system) for starting an engine is described in reference with FIG. 6.

The engine starting auxiliary system includes an auxiliary-ECU 1 that outputs an engine start signal to an engine-ECU 2 in accordance with signals detected using a push switch 7 and a brake switch 8.

The auxiliary-ECU 1 is supplied with electricity from a power source 9 via a terminal (power supply device) 6. The power source 9 is a battery or the like. The engine-ECU 2 is also supplied with electricity from the power source 9 via the terminal 6.

The auxiliary-ECU 1 serves as an auxiliary electricity supply means. The engine-ECU 2 serves as an engine control means. The auxiliary-ECU 1 inputs a signal, which indicates engine starting, transmitted from the engine-ECU 2. When the auxiliary-ECU 1 detects the engine starting, the auxiliary-ECU 1 supplies electricity to a load operating means 4 such as a starter relay, as well as the engine-ECU 2.

Next, an operation of the engine starting auxiliary system is described.

When the auxiliary-ECU 1 inputs a signal indicating a condition, in which the push switch 7 is turned ON, during the auxiliary-ECU 1 inputs a signal indicating a condition, in which the brake switch 8 is turned ON, the auxiliary-ECU 1 outputs an engine start signal to the engine-ECU 2. Thereby, the engine-ECU 2 evaluates whether engine starting is performed. When the engine-ECU 2 determines that the engine starting is performed, the engine-ECU 2 outputs a signal, which indicates the engine starting, to the auxiliary-ECU 1, and the engine-ECU 2 supplies electricity to the load operating means 4 for operating a starter. When the auxiliary-ECU 1 inputs the signal, which indicates engine starting, from the engine-ECU 2, the auxiliary-ECU 1 determines that the engine-ECU 2 starts the engine. The auxiliary-ECU 1 supplies electricity to the load operating means 4 for operating the starter, as well as the engine-ECU 2.

Thereby, the load operating means 4 is supplied with electricity, and the load operating means 4 is turned ON, so that the starter 5 is supplied with electricity from the power source 9. Thus, the engine is started.

In this situation, the engine-ECU 2 supplies electricity to the load operating means 4 in accordance with electricity supply from the terminal 6. When voltage of the terminal 6 decreases to be less than a reset level (first reset level), electricity supply is reset, and electricity supplied to the load operating means 4 is terminated. Here, in the following description, a term of battery voltage represents the voltage of the terminal 6 as a matter of convenience.

Even when the engine-ECU 2 resets electricity supply, a boosting circuit 1*a* of the auxiliary-ECU 1 boosts the battery voltage supplied from the terminal 6.

Specifically, the booster 1*a* of the auxiliary-ECU 1 increases the battery voltage supplied from the power source 9 via the terminal 6, when the voltage of the terminal 6 becomes lower than a predetermined level.

In this situation, a CPU included in the auxiliary-ECU 1 is operated at a low-voltage condition. Accordingly, the auxiliary-ECU 1 is not reset, and the auxiliary-ECU 1 supplies electricity to the load operating means 4, instead of the engine-ECU 2.

Thus, the load operating means 4 is turned ON, and the power supply 9 supplies electricity to the starter 5. In this condition, the engine may start, or an engine starting load may be reduced as the starter 5 rotates, so that the battery voltage recovers to the recovery level, and the condition, in which the engine-ECU 2 resets electricity supply, is cancelled. Electricity supply from the engine-ECU 2 to the load operating means 4 is resumed, so that the engine is started.

In this engine starting auxiliary system, the auxiliary-ECU 1 supplies electricity to the load operating means 4, so that the engine can be started, even when the engine-ECU 2 resets electricity supply to the load operating means 4.

In this structure, the auxiliary-ECU 1 and the engine-ECU 2 respectively supply electricity to the load operating means 4. However, the operations of the auxiliary-ECU 1 and the engine-ECU 2 may not be synchronized.

Accordingly, when the auxiliary-ECU 1 starts supplying electricity to the load operating means 4, the engine-ECU 2 may have already reset electricity supply to the load operating means 4. In this case, the load operating means 4 may repeat turning ON and OFF in a short period. As a result, the load operating means 4 may cause a disorder.

Figure 1:
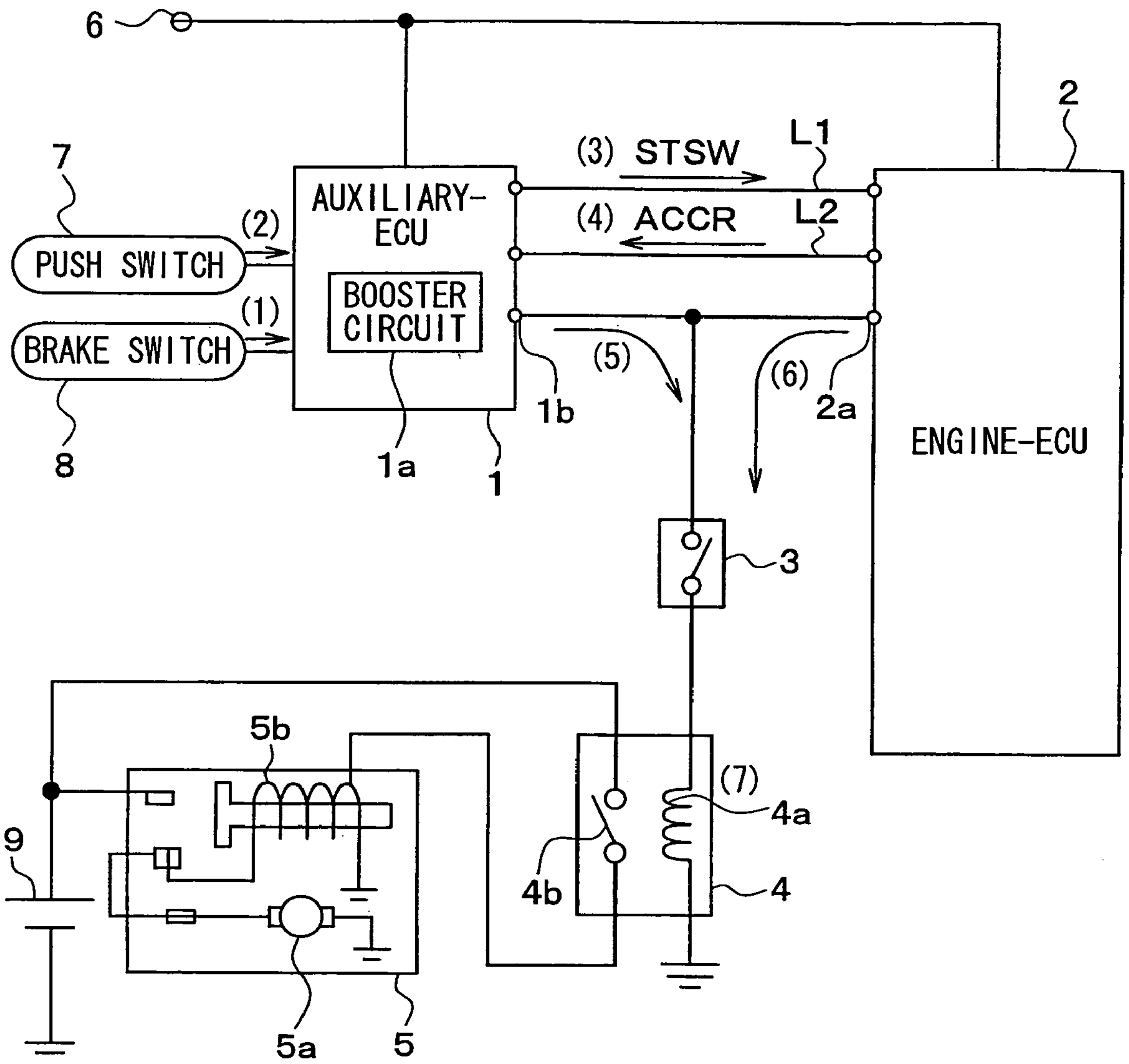
FIG. 1 is a schematic diagram showing an auxiliary system for starting an engine, according to a first embodiment of the present invention.

Here, as shown in FIG. 1, an engine starting auxiliary system includes an auxiliary-ECU 1, an engine-ECU 2, the switch 3, a starter relay 4, and the starter 5. The starter relay 4 serves as the load operating means 4.

Figure 5:
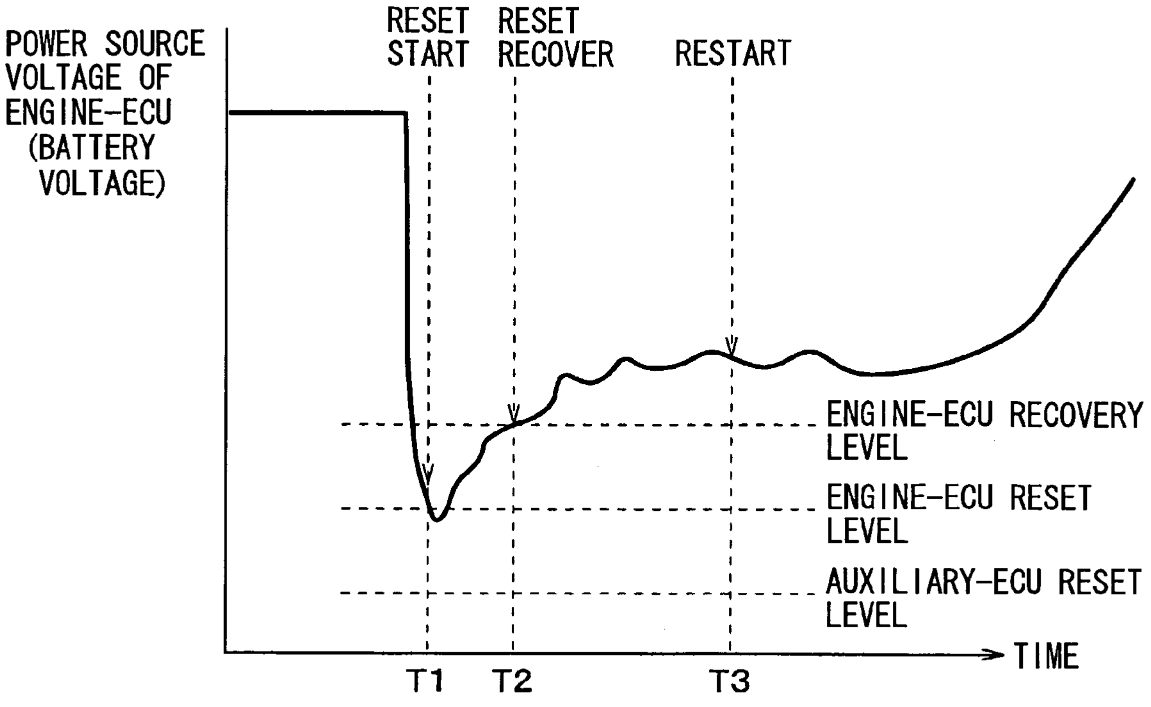
FIG. 5 is a graph showing a relationship between battery voltage and elapsed time.

The auxiliary-ECU 1 operates in accordance with electricity supply from the terminal 6. The auxiliary-ECU 1 is constructed of an ECU (power source ECU) for controlling a power source, for example. The auxiliary-ECU 1 includes the booster circuit (boosting means) 1*a*. When the battery voltage from the terminal 6 is less than a predetermined level, the auxiliary-ECU 1 boosts the battery voltage from the terminal 6 using the booster circuit 1*a*, so that the auxiliary-ECU 1 produces voltage for an auxiliary control of engine starting. A reset level (second reset level) of the auxiliary-ECU 1 is less than a reset level (first reset level) of the engine-ECU 2. Specifically, the auxiliary-ECU 1 is not reset even when voltage decreases to be less than the reset level of the engine-ECU 2. That is, even when the engine-ECU 2 is in a reset condition, the booster circuit 1*a* produces voltage needed for the auxiliary control (engine start auxiliary control) of engine start. FIG. 5 depicts the reset level (auxiliary-ECU reset level) of the auxiliary-ECU 1 as a reference.

The auxiliary-ECU 1 inputs signals of a push switch 7 and a brake switch 8. The signal of the push switch 7 indicates a condition, in which a driver turns the push switch ON. The signal of the brake switch 8 represents a condition, in which the driver steps a brake pedal, so that the brake switch 8 is turned ON.

When the auxiliary-ECU 1 inputs the signal, which indicates the ON condition of the push switch 7, while the auxiliary-ECU 1 inputs the signal, which represents the ON condition of the brake switch 8, the auxiliary-ECU 1 outputs an engine start signal (STSW) to the engine-ECU 2 to perform engine starting. The engine start signal (STSW) is transmitted via a signal line L1 that connects the auxiliary-ECU 1 with the engine-ECU 2.

When the auxiliary-ECU 1 inputs a signal, which indicates a condition where the engine-ECU 2 starts the engine, the auxiliary-ECU 1 supplies electricity to the starter relay 4 via an output terminal 1*b*, simultaneously with or in advance of supplying electricity to the starter relay 4 by the engine-ECU 2.

Alternatively, when the auxiliary-ECU 1 inputs an accessory-OFF signal (ACCR) from the engine-ECU 2, the auxiliary-ECU 1 may supply electricity to the starter relay 4 via an output terminal 1*b*.

In this condition, a period (auxiliary supply period), in which the auxiliary-ECU 1 supplies electricity to the starter relay, is set to be longer than a period, which is between the timing (reset start shown FIG. 5), in which the reset is performed, and a timing, in which the engine starting is resumed, in general.

In addition, the period, in which the auxiliary-ECU 1 supplies electricity, is set to be shorter than a period, which is consumed when the engine is almost started by cranking however the engine is not started as a result, in general.

For example, it is assumed that an interval, which is between starting of the reset and the engine starting is resumed, is 150 ms, in general. In addition, it is assumed that the period, in which the auxiliary-ECU 1 supplies electricity, is 500 ms in general, such that this period is set to be shorter than the period consumed when the engine is almost started by cranking however the engine is not started as a result. Based on these assumptions, the period, in which the ECU 1 supplies electricity, is set at 300 ms, for example.

The auxiliary-ECU 1 may continuously supply electricity for a period from the timing where the push switch 7 is turned ON, to the timing where the push switch 7 is turned OFF.

Alternatively, in the case where the engine is not started when the push switch 7 is turned ON for the first time, the auxiliary-ECU 1 may continuously supply electricity for the period, from the timing where the push switch 7 is turned ON to the timing where the push switch 7 is turned OFF. Even in these cases, the maximum period, in which the auxiliary-ECU 1 continuously supplies electricity, is preferably within about 15 s for protecting the starter 5 from causing disorder. For example, endurance period (electrical endurance) of the starter 5 is set at 60 s, and a maximum continuative period, in which the engine-ECU 2 can continuously supply electricity at one time to start the engine, is set at 30 s. In this case, even when electricity supply performed by the engine-ECU 2 and electricity supply performed by the auxiliary-ECU 1 are continued for the respective maximum continuative periods, the total period of the electricity supplies does not exceed the endurance period of the of the starter 5. Specifically, the period, in which the auxiliary-ECU 1 supplies electricity, is set to be less than a period, which is calculated by subtracting the maximum period, in which the engine-ECU 2 supplies electricity, from the endurance period of the of the starter 5, for example.

The engine-ECU 2 operates in accordance with electricity supply from the terminal 6, similarly to the auxiliary-ECU 1. The engine-ECU 2 can perform generally known operations such as transmitting a signal to the engine for fuel injection in accordance with stepping degree of an accelerator pedal (not shown). When the engine-ECU 2 inputs the engine start signal, the engine-ECU 2 evaluates whether a condition for engine starting is satisfied. When the condition for engine starting is satisfied, the engine-ECU 2 transmits the accessory-OFF signal (ACCR) to the auxiliary-ECU 1 to turn accessories OFF for engine starting. The accessory-OFF signal is transmitted via the signal line L2, which connects the auxiliary-ECU 1 with the engine-ECU 2 for transmitting signals. The engine-ECU 2 transmits the accessory-OFF signal to the auxiliary-ECU 1, so that the timing for engine starting is properly transmitted.

When the above conditions are satisfied, the engine-ECU 2 supplies electricity to the starter relay 4 via an output terminal 2*a* for engine starting in accordance with electricity supply from the terminal 6.

The engine-ECU 2 evaluates whether the battery voltage of the terminal 6 is equal to or greater then the reset level of the engine-ECU 2. When the battery voltage is less than the reset level, the engine-ECU 2 resets electricity supply to the starter relay 4. In this condition, the engine-ECU 2 does not supply electricity to the starter relay 4 until the battery voltage recovers to a recovery level (engine-ECU recovery level shown in FIG. 5), which is set to be greater than the reset level.

The switch 3 is turned ON and OFF in accordance with the position of gears. The switch 3 is turned ON when the gears are either in the neutral position or in the parking position in an automatic transmission car. The switch 3 turned ON when the clutch is stepped in a manual transmission car. The starter relay 4 may have a generally known structure, which includes a winding 4*a* and a relay switch 4*b*. When the winding 4*a* is supplied with electricity, the winding 4*a* generates electromagnetic force to turn the relay switch 4*b* ON, for example.

The starter 5 may have a generally known structure, which includes the starter motor 5*a* and the starter coil 5*b*. A power source 9 supplies the starter 5 with electricity. An electricity line electrically connects the power source 9 with the starter 5. The relay switch 4*b* of the starter relay 4 connects and disconnects the electricity line.

Next, an operation of the engine starting auxiliary system is described. The numerals (1) to (7) shown in FIG. 1 respectively correspond to the numerals (1) to (7) shown in FIG. 2.

Figure 2:
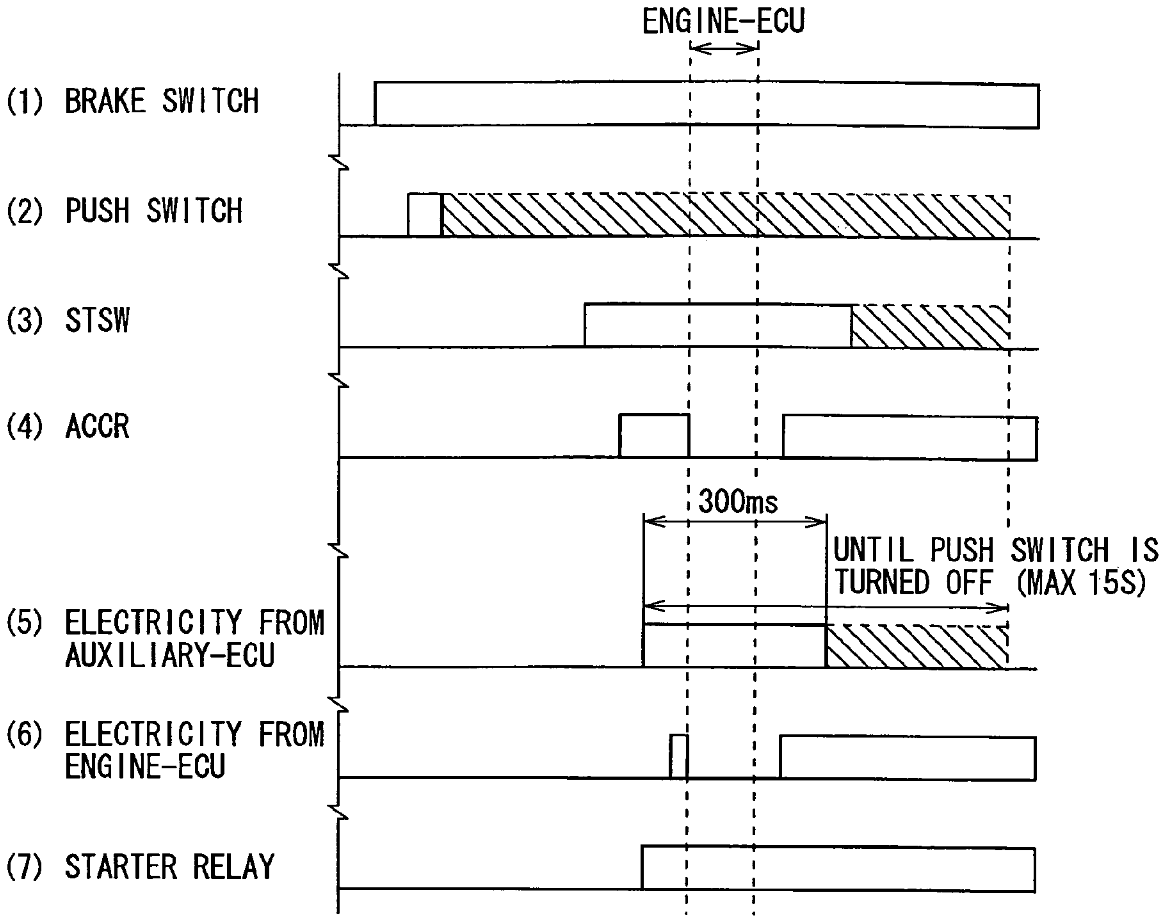
FIG. 2 is a time chart showing operations of signals and components of the auxiliary system for starting the engine, according to the first embodiment.

As shown in FIG. 2, when the auxiliary-ECU 1 inputs the signal indicating the condition, in which the brake switch 8 is turned ON (1), and when the auxiliary-ECU 1 simultaneously inputs the signal indicating the condition, in which the push switch 7 is turned ON (2), the auxiliary-ECU 1 outputs the engine start signal (STSW) to the engine-ECU 2 (3). That is, when both the conditions (1) and (2) are satisfied, the condition (3) is made. When the condition (3) is made, the engine-ECU 2 evaluates whether an engine starting condition is satisfied. For example, the engine starting condition is satisfied when verification of the immobilizer is made. When the engine-ECU 2 determines that the engine starting condition is satisfied, the engine-ECU 2 transmits the accessory-OFF signal (ACCR) to the auxiliary-ECU 1 (4). Subsequently, the engine-ECU 2 supplies electricity to the starter relay 4 (6) for operating the starter, after elapsing a predetermined period.

When the auxiliary-ECU 1 inputs the accessory-OFF signal from the engine-ECU 2, the auxiliary-ECU 1 determines that the engine-ECU 2 starts the engine, for example.

In this condition, the auxiliary-ECU 1 supplies electricity to the starter relay 4 (5) for operating the starter relay 4, similarly to the engine-ECU 2. Specifically, the auxiliary-ECU 1 supplies electricity to the starter relay 4 (5) for a period such as 300 ms, for example.

In this situation, the timing, in which the auxiliary-ECU 1 supplies electricity to the starter relay 4, is set to be simultaneously with or earlier than the timing, in which the engine-ECU 2 supplies electricity to the starter relay 4. Specifically, the engine-ECU 2 supplies electricity after elapsing a predetermined period, which is equal to or greater than 0 s, later than outputting a signal indicating engine starting. The signal indicating engine starting includes the accessory-OFF signal, for example. Therefore, it is adjusted that the auxiliary-ECU 1 supplies electricity to the starter relay 4 before elapsing the predetermined period, which is equal to or greater than 0 s, in advance of the condition where the engine-ECU 2 supplies electricity to the starter relay 4.

When the starter relay 4 is supplied with electricity, the winding 4*a* of the starter relay 4 is energized, so that the starter switch 4*b* is turned ON (7) by the electromagnetic force generated by the winding 4*a*. Thereby, the power source 9 supplies electricity to the starter 5, so that the engine is started.

In this situation, the engine-ECU 2 supplies electricity to the starter relay 4 in accordance with electricity supply from the terminal 6. When the battery voltage decreases to be less than the reset level of the engine-ECU 2, the engine-ECU 2 terminates electricity supply to the starter relay 4, so that the engine-ECU 2 resets the condition, in which the starter relay 4 is supplied with electricity from the engine-ECU 2.

However, even when the engine-ECU 2 resets electricity supply to the starter relay 4, the booster circuit 1*a* of the auxiliary-ECU 1 boosts the battery voltage, so that the auxiliary-ECU 1 supplies electricity to the starter relay 4 instead of the engine-ECU 2.

Thereby, the switch 4*b* of the starter relay 4 is turned ON, so that the power source 9 supplies electricity to the starter 5. In this situation, the engine is started, or load for engine starting is being reduced, and the battery voltage recovers to the recovery level. Thereby, the condition, in which the engine-ECU 2 resets electricity supply, is cancelled, so that the engine-ECU 2 resumes supplying electricity to the starter relay 4. Thus, the engine is started.

The period, in which the auxiliary-ECU 1 supplies electricity, is set to be greater than the period, which is from resetting supplying electricity by the engine-ECU 2 until the engine starting is resumed. Therefore, the engine can be steadily started by supplying electricity from the auxiliary-ECU 1.

As described above, the auxiliary-ECU 1 terminates supplying electricity after elapsing 300 ms, for example. However, as depicted by hatching in FIG. 2, when the push switch 7 is maintained turned ON (2), the auxiliary-ECU 1 may continue supplying electricity (5) until the push switch 7 is turned OFF.

As described above, in this engine starting auxiliary system, even when the engine-ECU 2 resets electricity supply during the engine is started, the auxiliary-ECU 1 having the booster circuit 1*a* supplies electricity to the starter relay 4 instead of the engine-ECU 2.

Therefore, even when the battery voltage becomes less than the reset level of the engine-ECU 2, and the engine-ECU 2 resets electricity supply during the engine is being started, the engine can be started. Thus, a condition, in which the engine cannot be started, may be avoided.

In this embodiment, the auxiliary-ECU 1 supplies electricity to the starter relay 4 simultaneously with or before the engine-ECU 2 starts electricity supply to the starter relay 4. Therefore, even when the engine-ECU 2 resets electricity supply, the winding 4*a* is regularly supplied with electricity from the auxiliary-ECU 1 for the period, in which electricity supply from the engine-ECU 2 is reset and terminated, regardless of the timing of the reset performed by the engine-ECU 2.

Thereby, the starter relay 4 can be restricted from repeating turning ON and OFF in a short period, so that the terminals of the starter switch 4*b* can be restricted from causing abrasion and welding.

In the above structure, the auxiliary-ECU 1 is connected with the engine-ECU 2 via the signal lines L1 and L2, through which the signal, which indicates engine starting, such as the engine start signal (STSW) and the accessory-OFF signal (ACCR) are transmitted. Therefore, the auxiliary-ECU 1 and the engine-ECU 2 are synchronized via the signal lines L1 and L2, so that the starter relay 4 can be properly controlled.

The transmitted signals via the signal lines L1 and L2 are not limited to the engine start signal (STSW) and the accessory-OFF signal (ACCR).

(Second Embodiment)

Figure 3:
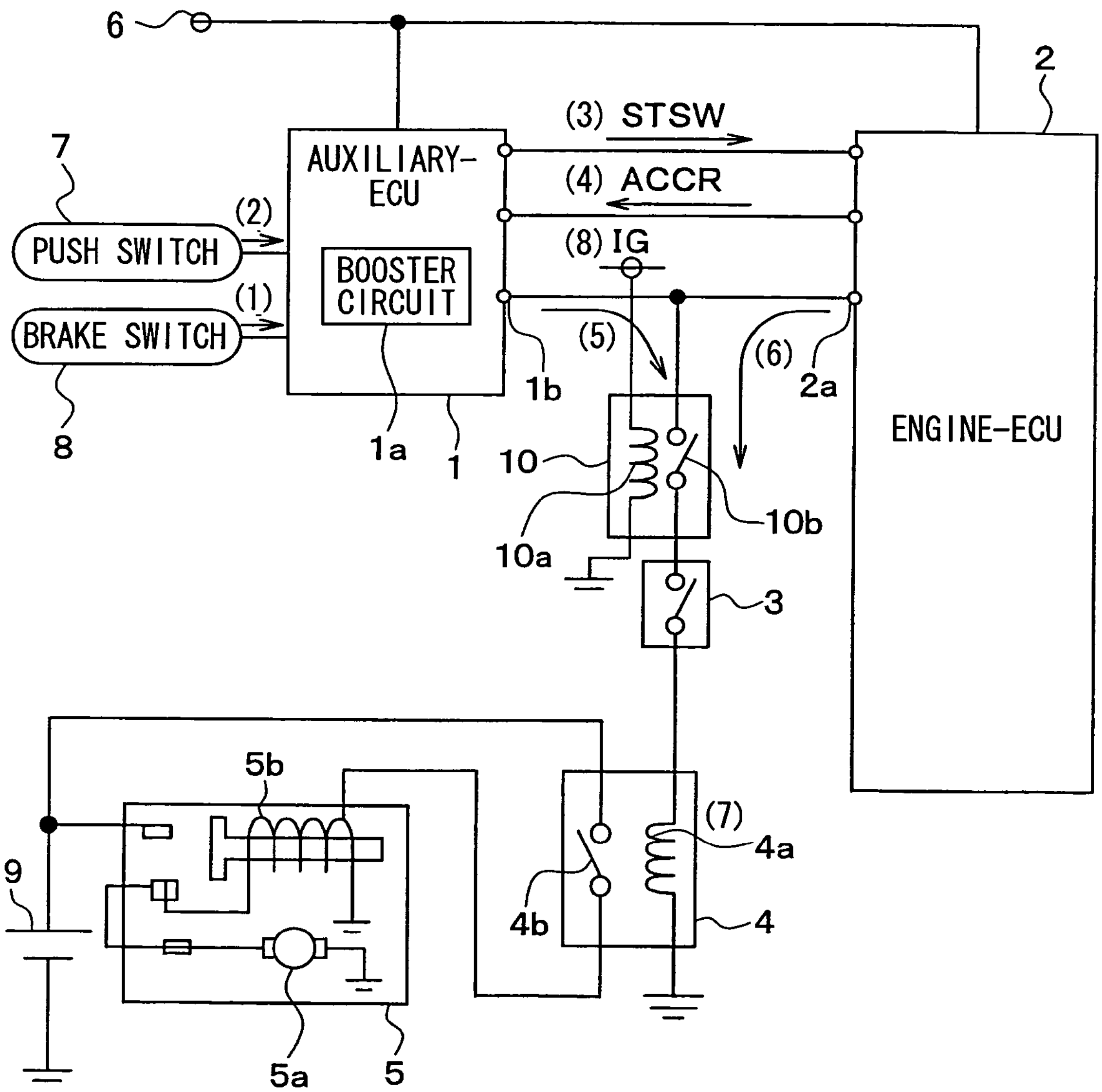
FIG. 3 is a schematic diagram showing an auxiliary system for starting an engine, according to a second embodiment of the present invention.

As shown in FIG. 3, the engine starting auxiliary system includes a relay 10, in this embodiment. The relay 10 includes a winding 10*a* and a relay switch 10*b*. Ignition voltage is applied to the winding 10*a*. Specifically, ignition voltage is applied to the winding 10*a* only when the ignition is turned ON, and ignition voltage is not applied to the winding 10*a* when the ignition is turned OFF. When the winding 10*a* is supplied with electricity, the winding 10*a* generates electromagnetic force to turn the relay switch 10*b* ON. The relay switch 10*b* connects and disconnects the line for supplying electricity to the starter relay 4 from either the auxiliary-ECU 1 or the engine-ECU 2.

In this embodiment, the relay switch 10*b* is turned ON and OFF corresponding to the condition, whether the ignition is turned ON or OFF, so that the electricity line, through which one of the auxiliary-ECU 1 and the engine-ECU 2 supplies electricity to the starter relay 4, is connected and disconnected. Therefore, either the auxiliary-ECU 1 or the engine-ECU 2 supplies electricity to the starter relay 4, only when the ignition is turned ON.

Either the auxiliary-ECU 1 or the engine-ECU 2 may cause disorder, and the starter relay 4 may be continuously supplied with electricity, even when electricity need not be supplied for engine starting. However, even in this situation, electricity supplied to the starter relay can be steadily turned OFF, when the ignition is turned OFF, in the circuit of this embodiment. Thereby, safe performance of the engine starting auxiliary system can be enhanced.

Figure 4:
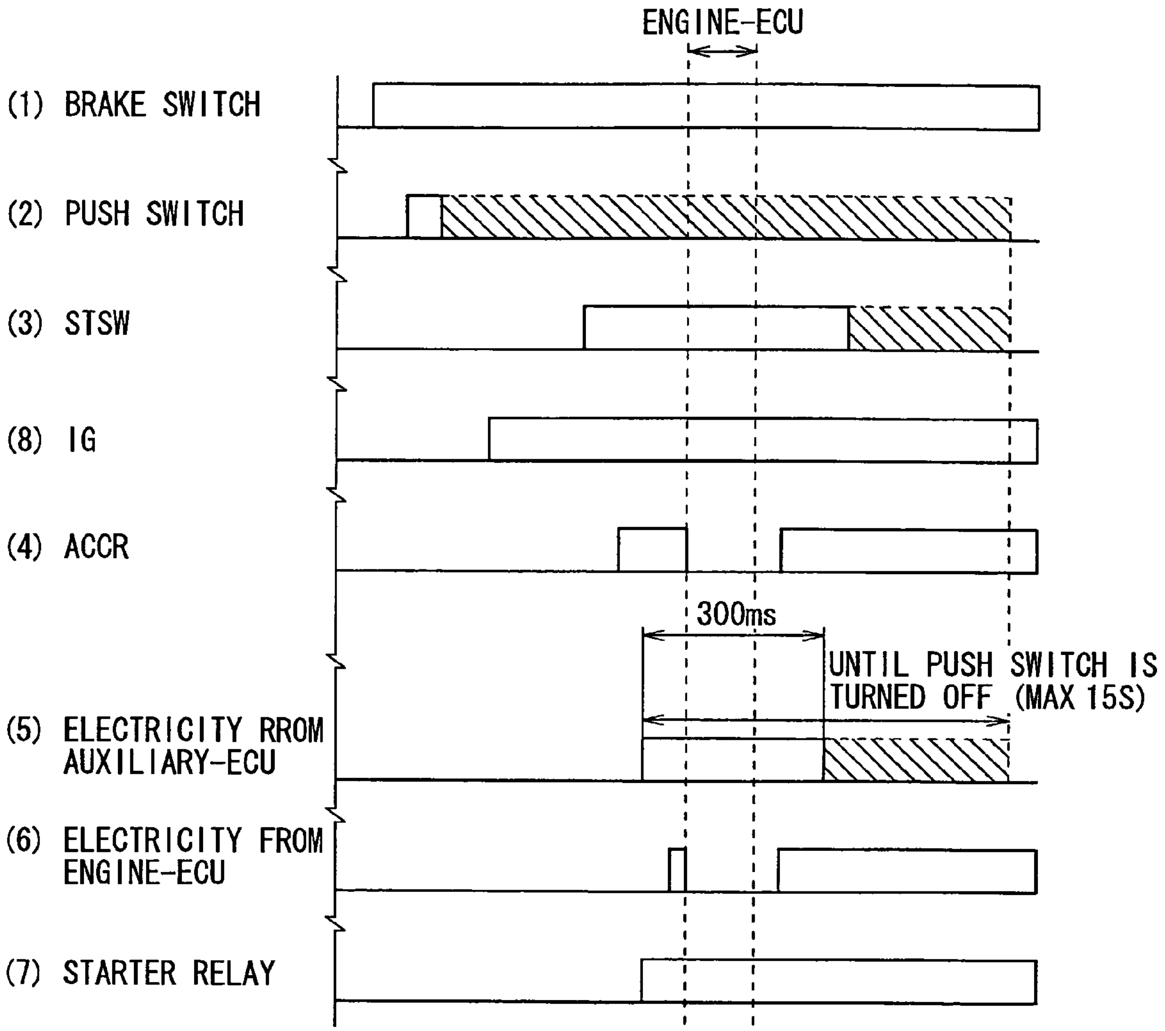
FIG. 4 is a time chart showing operations of signals and components of the auxiliary system for starting the engine, according to the second embodiment.

FIG. 4 depicts a timing chart of an operation of the engine starting auxiliary system, in which the starter relay 4 is operated only when the ignition voltage is applied, as described in this embodiment. In this operation, when the push switch 7 is pushed, the ignition is turned ON (8), subsequently, the signal, which indicates engine starting such as the accessory-OFF signal, is output (4), and an engine start signal is output (5).

(Modified Embodiment)

The embodiments described above may be modified in various ways.

For example, the terminal 6 may be connected to another power source (not shown) different from the power source 9. This power source and the power source 9 may be batteries. In such a case, the voltage of the terminal 6 will not fall while staring the engine, because the terminal 6 may not be affected by the starter motor 5*b*. The voltage of the terminal 6, however, may drop below the engine-ECU reset level because of electrical loads other than the starter motor 5*b*, deterioration of the terminal 6, noise, temperature, for example. Even in this instance, the booster 1*a* enables the auxiliary ECU 1 to supply the electricity to the starter relay 4. Therefore, the starter motor 5*b* runs and the engine may be started, even when the engine ECU 2 resets the supply of the electricity.

The above engine starting auxiliary system can be used in a general system, in which an engine is started by rotating a key cylinder, instead of operating the push switch 7.

The booster circuit 1*a* is not needed for the auxiliary-ECU 1.

Any equivalent operations can be conducted in a structure in which the auxiliary-ECU 1 is reset at the reset level, which is lower than the reset level of the engine-ECU 2, and the starter relay 4 can be supplied with electricity even in the case where the battery voltage decreases to be less than the reset level of the engine-ECU 2.

The power supply is not limited to a battery. The power supply may be a capacitor or the like.

The structures and methods of the above embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An auxiliary system for starting an engine, the system comprising:

a starter;

a power source that supplies electricity to the starter;

a load operating means that controls electricity supplied from the power source to the starter;

an engine control means that turns the load operating means ON for supplying electricity from the power source to the starter in accordance with electricity supply from a power supply device when the engine is started;

an auxiliary electricity supply means that turns the load operating means ON for supplying electricity from the power source to the starter in accordance with electricity supply from the power supply device when the engine is started;

wherein when voltage of the power supply device becomes less than a first reset level, the engine control means resets electricity supply to the load operating means, when the auxiliary electricity supply means inputs a signal, which indicates a condition where the engine control means starts the engine, the auxiliary electricity supply means supplies electricity to the load operating means at a timing simultaneously with or in advance of supplying electricity to the load operating means by the engine control means, and when the engine control means resets electricity supply to the load operating means, the auxiliary electricity supply means supplies electricity to the load operating means instead of the engine control means.

2. The system according to claim 1, wherein the auxiliary electricity supply means includes a boosting means, and the boosting means is capable of boosting voltage of the power supply device, so that the auxiliary electricity supply means is capable of supplying electricity to a winding of the load operating means, even when voltage of the power supply device becomes less than the first reset level.

3. The system according to claim 1, further comprising:

a switch that is capable of connecting and disconnecting a line, through which the engine control means and the auxiliary electricity supply means supply electricity to the load operating means, wherein when a predetermined condition is satisfied, the switch connects the line, and when the predetermined condition is not satisfied, the switch disconnects the line.

4. The system according to claim 1, wherein the auxiliary electricity supply means supplies electricity to the load operating means until voltage of the power supply device decreases to a second reset level, which is lower than the first reset level, at which the engine control means resets electricity supply to the load operating means.

5. The system according to claim 1, wherein the auxiliary electricity supply means is capable of inputting both a signal from a push switch and a signal from a brake switch, and the auxiliary electricity supply means outputs an engine start signal to the engine control means for starting the engine when the following two conditions are simultaneously satisfied:

the auxiliary electricity supply means inputs a signal, which indicates operation of a brake, from the brake switch; and the auxiliary electricity supply means inputs a signal, which indicates operation of the push switch.

6. The system according to claim 1, wherein the auxiliary electricity supply means supplies electricity to the load operating means for an auxiliary supply period, the auxiliary supply period is longer than a period between timing, at which the engine control means resets, and timing, at which engine starting is resumed, and the auxiliary supply period is shorter than a period between the timing, at which the engine control means resets, and timing, at which the engine is started by the engine starting.

7. The system according to claim 6, wherein the auxiliary electricity supply means supplies electricity to the load operating means for a period, which is equal to or greater than 150 ms.

8. The system according to claim 6, wherein the auxiliary electricity supply means supplies electricity to the load operating means for substantially 300 ms.

9. The system according to claim 6, wherein the auxiliary electricity supply means supplies electricity to the load operating means during a period, in which the auxiliary electricity supply means inputs a signal, which indicates operation of a push switch, from the push switch.

10. The system according to claim 9, wherein the engine control means is capable of continuously supplying electricity for starting the engine at one time within a maximum continuative period, which is predetermined, the auxiliary electricity supply means terminates electricity supply to the load operating means after elapsing the auxiliary supply period, even in a period, in which the auxiliary electricity supply means inputs the signal indicating an operation of the push switch from the push switch, and the auxiliary supply period is set to be less than a period, which is calculated by subtracting the maximum continuative period, in which the engine control means continuously supplies electricity, from a period, which is equivalent to an endurance period of the of the starter.

11. The system according to claim 10, wherein the auxiliary electricity supply means supplies electricity to the load operating means for a period, which is equal to or less than 15 s.

12. The system according claim 1, wherein the power source includes a first battery, the power supply device includes a second battery, and the first battery is different from the second battery.

13. The system according to claim 1, wherein the power supply device connects with the power source for receiving electric power of the power source.

14. The system according to claim 1, wherein the auxiliary electricity supply means and the engine control means connect with the power supply device via the power supply device.

* * * * *